(12) United States Patent
Besnier et al.

(10) Patent No.: US 6,717,288 B2
(45) Date of Patent: Apr. 6, 2004

(54) MULTIPLE-VOLTAGE POWER SUPPLY CIRCUITRY FOR MOTOR VEHICLES

(75) Inventors: Pascal Besnier, Saint Brevins les Pins (FR); Luc Garcia-Malea, Pontchartrain (FR)

(73) Assignee: Peugeot Citroen Automobiles SA (FR)

( * ) Notice: Subject to any disclaimer, the term of this patent is extended or adjusted under 35 U.S.C. 154(b) by 100 days.

(21) Appl. No.: 10/018,181
(22) PCT Filed: Mar. 26, 2001
(86) PCT No.: PCT/FR01/00902
§ 371 (c)(1),
(2), (4) Date: Apr. 19, 2002
(87) PCT Pub. No.: WO01/79019
PCT Pub. Date: Oct. 25, 2001

(65) Prior Publication Data
US 2002/0149954 A1 Oct. 17, 2002

(30) Foreign Application Priority Data
Apr. 13, 2000 (FR) .............................. 00/04775
Oct. 27, 2000 (FR) .............................. 00/13838

(51) Int. Cl.⁷ ................................................. H02G 3/00
(52) U.S. Cl. ...................................... 307/10.1; 307/38
(58) Field of Search ....................... 322/7, 28; 323/207; 307/10.1, 18, 31, 38, 39, 125, 126, 130; 361/23, 31, 33

(56) References Cited

U.S. PATENT DOCUMENTS

| | | | | |
|---|---|---|---|---|
| 1,020,973 A | * | 3/1912 | Frisholm ..................... | 238/42 |
| 4,761,727 A | * | 8/1988 | Kammiller ................... | 363/98 |
| 5,057,763 A | * | 10/1991 | Torii et al. .................. | 322/8 |
| 5,469,000 A | * | 11/1995 | Geysen ....................... | 307/39 |
| 5,502,368 A | * | 3/1996 | Syverson et al. ............ | 322/28 |
| 5,596,261 A | * | 1/1997 | Suyama ..................... | 320/152 |
| 5,656,923 A | * | 8/1997 | Schultz et al. .............. | 323/207 |
| 5,848,659 A | * | 12/1998 | Karg et al. ................. | 180/65.4 |
| 5,982,645 A | * | 11/1999 | Levran et al. ............... | 363/37 |
| 6,078,486 A | * | 6/2000 | Le Cam ..................... | 361/23 |
| 6,625,553 B1 | * | 9/2003 | Modgil ....................... | 702/63 |

FOREIGN PATENT DOCUMENTS

DE     199 13 115        10/1999
DE     19913115 A1   *  10/1999

* cited by examiner

Primary Examiner—Adolf D. Berhane
(74) Attorney, Agent, or Firm—Kenyon & Kenyon

(57) ABSTRACT

An electrical power supply circuit for an automobile vehicle includes a primary stage powered by a main energy source. This primary stage outputs an AC current to a current loop supplying power to at least one primary winding of a transformer. A converter converting AC current to direct current or voltage is associated with the secondary winding of the transformer to create an auxiliary direct current or voltage source.

27 Claims, 5 Drawing Sheets

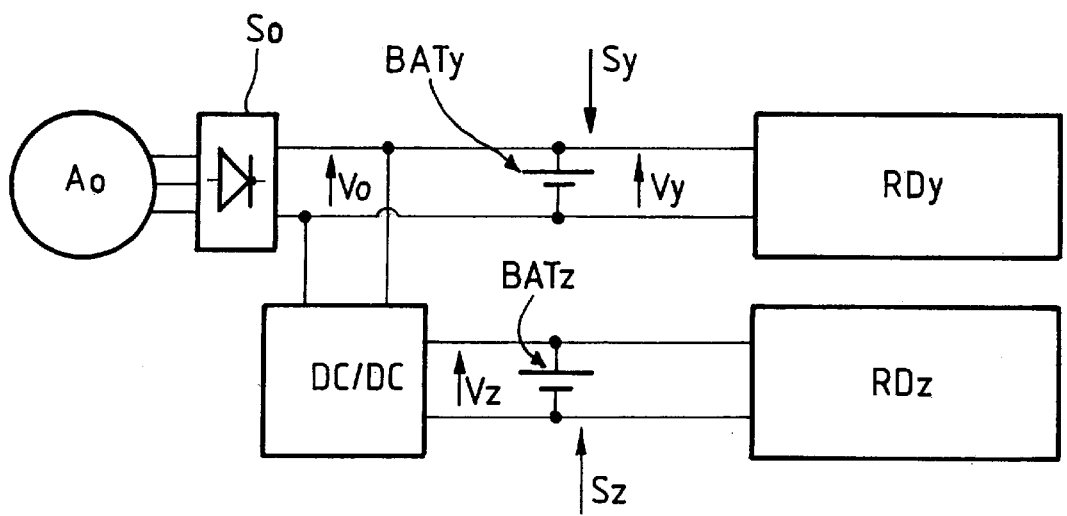
FIG_1
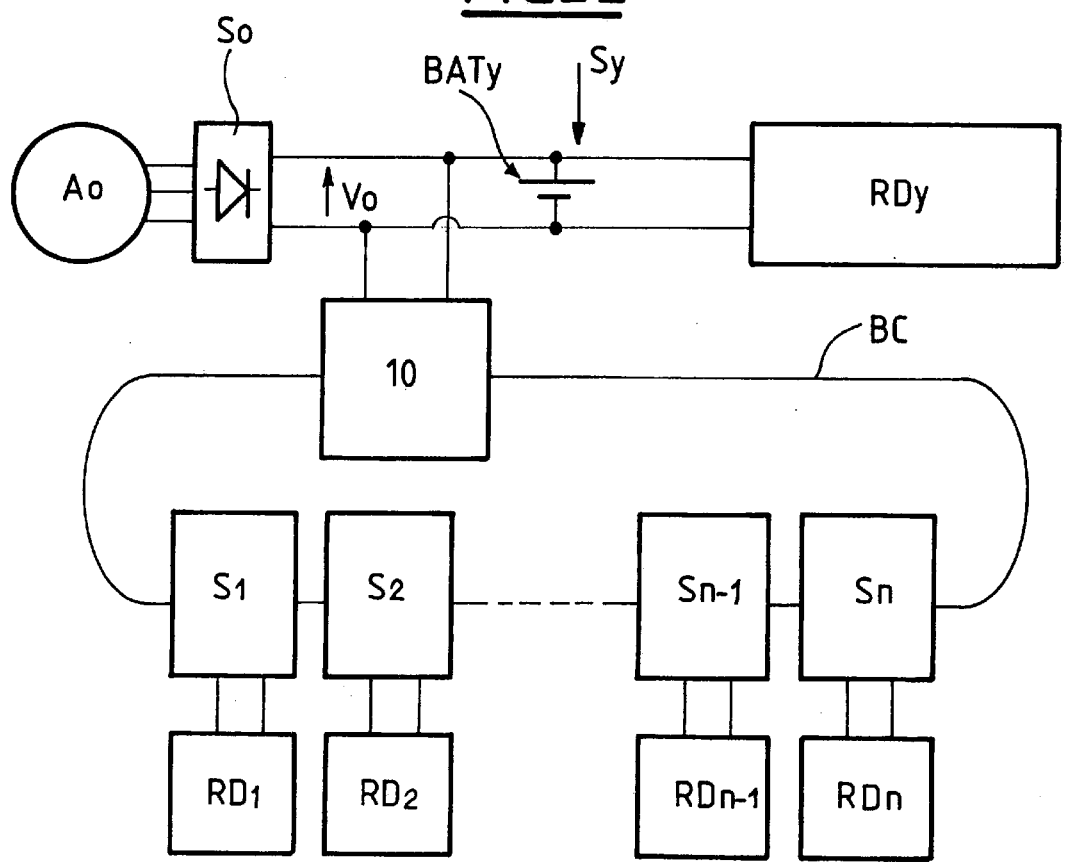
FIG_2

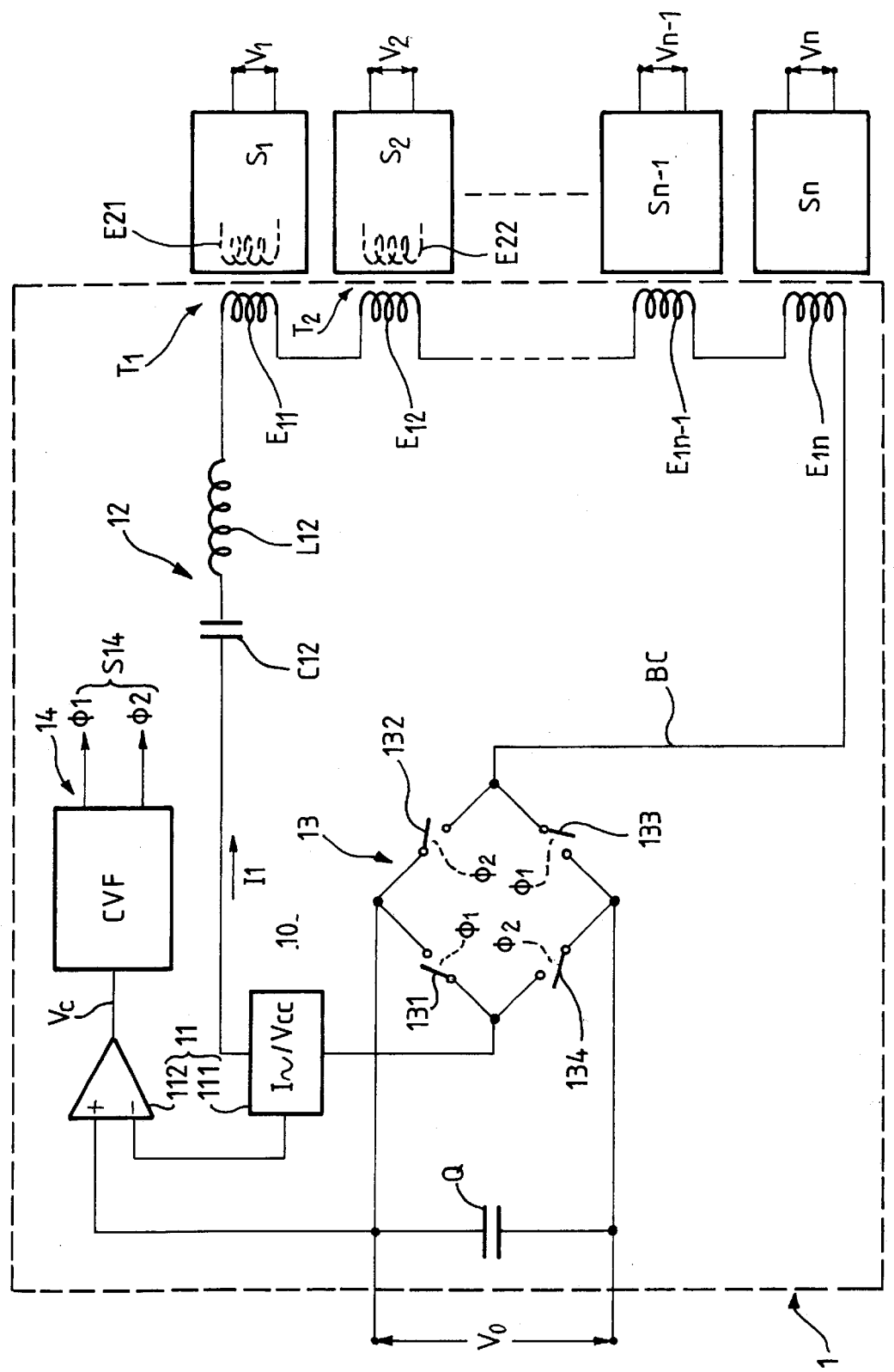
FIG_3

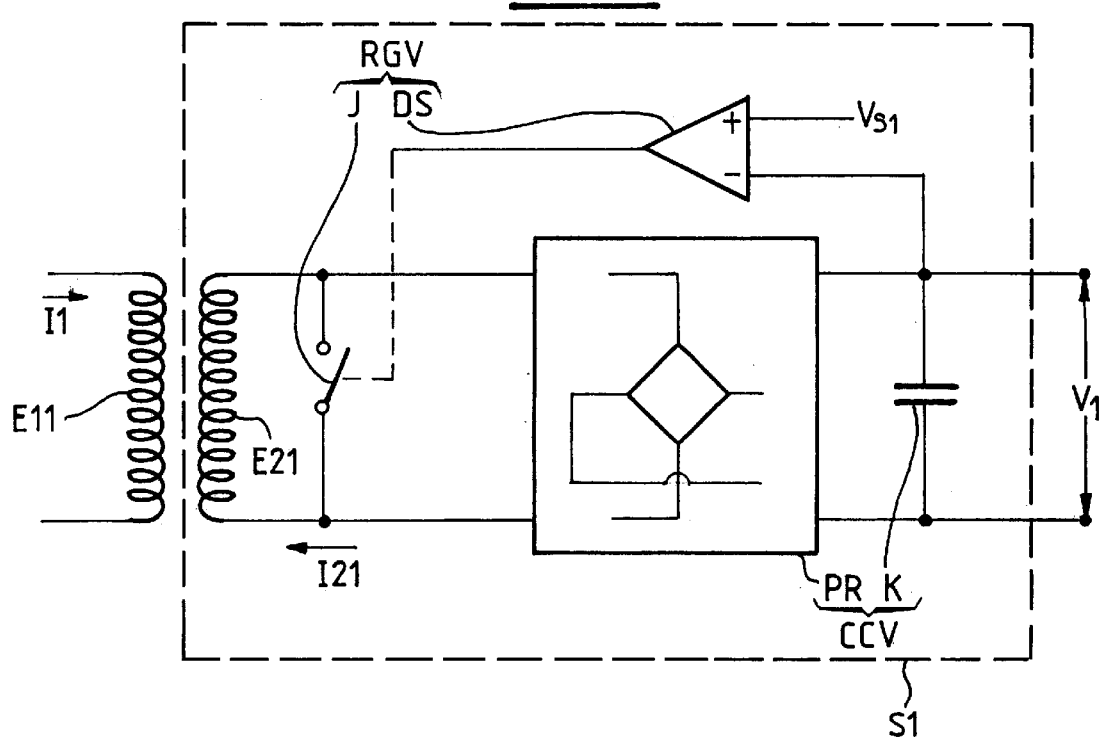
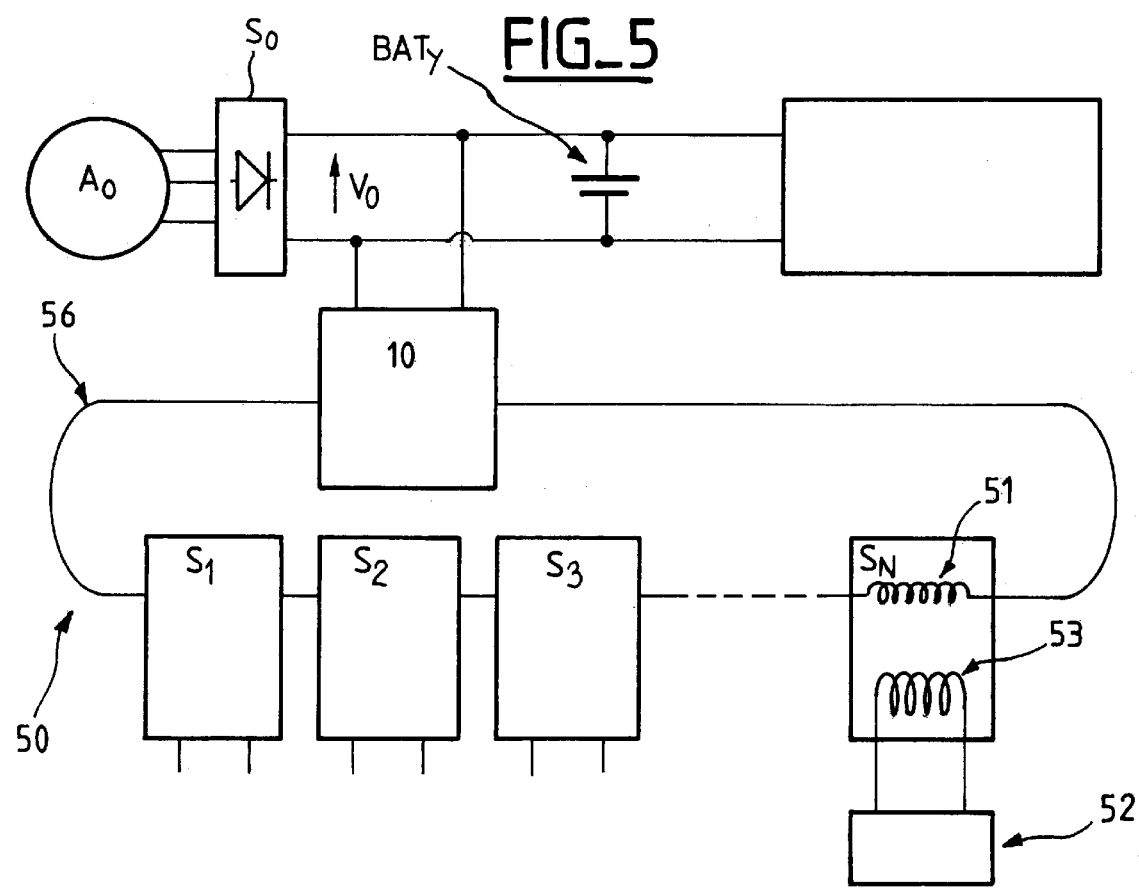

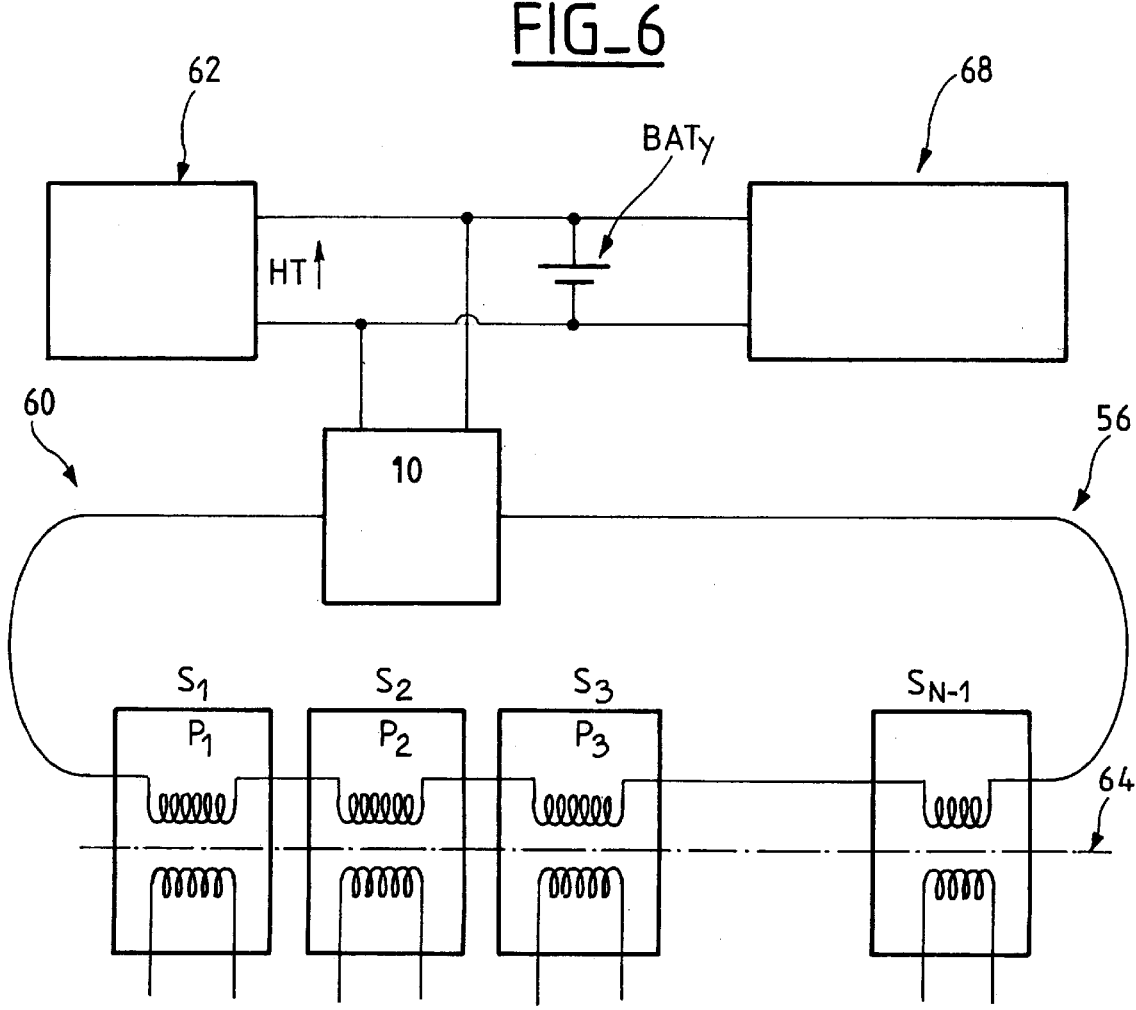
FIG_6

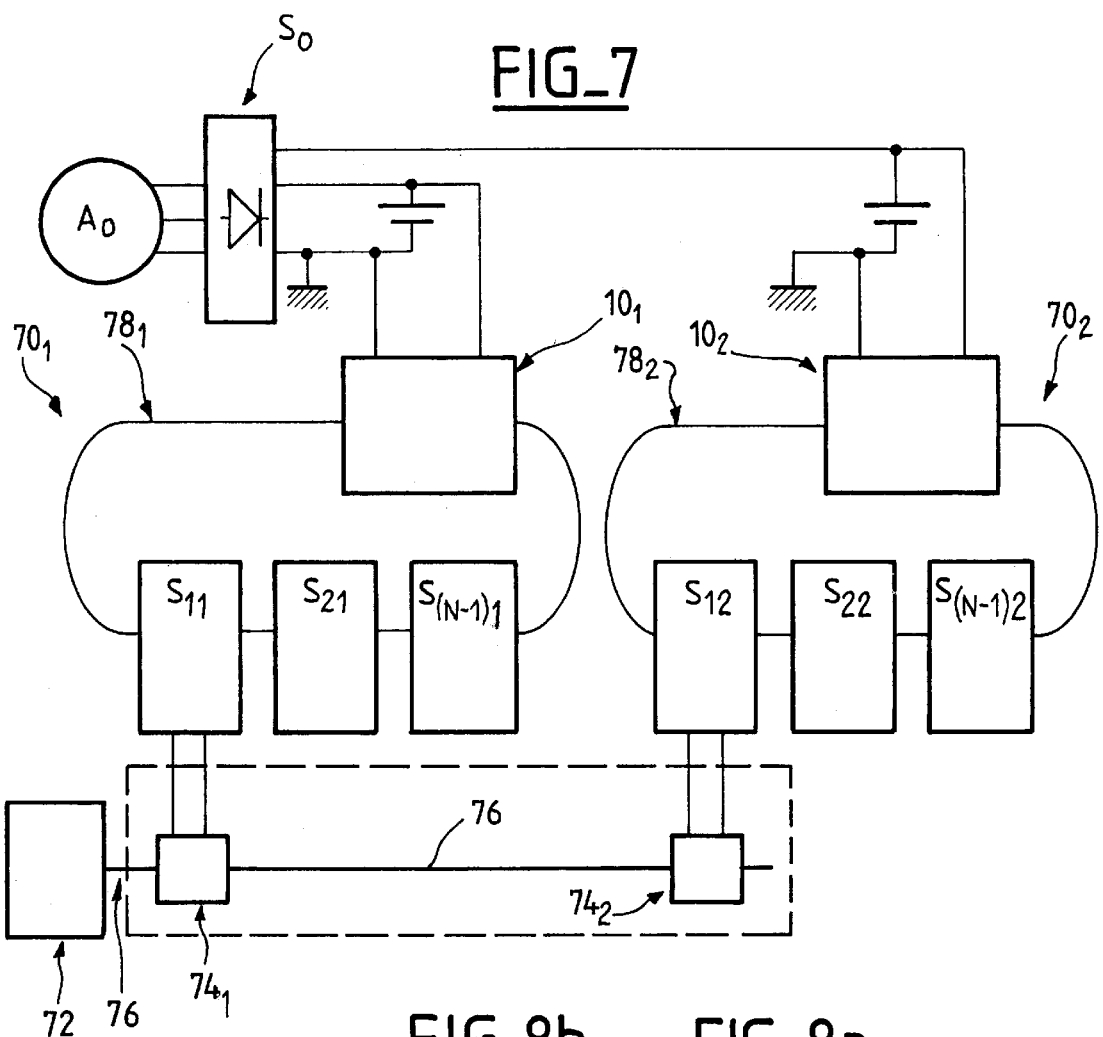
FIG_7
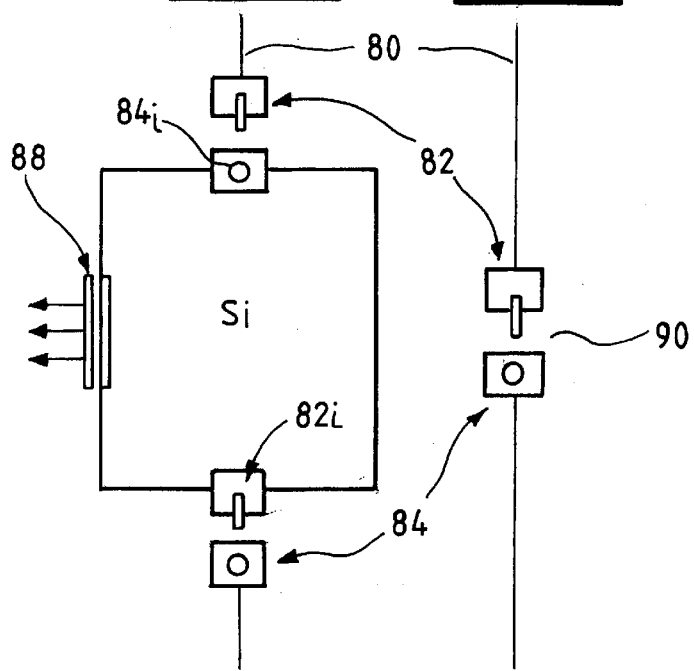
FIG_8b  FIG_8a

MULTIPLE-VOLTAGE POWER SUPPLY CIRCUITRY FOR MOTOR VEHICLES

FIELD OF THE INVENTION

The present invention generally relates to electrical power supply circuits, configured particularly for use on automobile vehicles.

More precisely, the present invention relates to an electrical power supply circuit of this type including a main direct voltage source powered by a rotating machine, and at least first and second auxiliary direct voltage sources powered from the main source.

BACKGROUND INFORMATION

The most conventional and the most widespread electrical circuit architecture at the moment is composed of an alternator driven by the engine of the vehicle and powering a distribution network at a single voltage, for example 14 volts, a 12 volt battery being installed on this network as a buffer.

Devices consuming electrical energy take power from this network through distribution boxes equipped with fuses that protect the electrical harness by isolating any electricity consumer device from the network if the device becomes defective, and particularly any device in which there is a short circuit.

In this type of architecture, devices consuming electrical energy can only dialog with each other through a multiplexed information network independent of the electrical energy distribution network.

The new situation created by the very fast growth in the number of electrical devices on automobile vehicles has recently made some automobile manufacturers consider increasing the voltage output by the electrical energy distribution circuit, for example increasing it to 42 volts instead of 14 volts.

However, since the construction of some electrical devices makes them inherently unsuitable for such an increase in the power supply voltage, and since a specific adaptation of these devices would lead to prohibitive costs, the planned evolution would initially require the use of at least two distribution networks, outputting electrical energy at two different voltages.

An example of the architecture of such an electrical energy supply circuit conform with this evolution is illustrated in FIG. 1.

This type of circuit typically includes a rotating machine, such as an alternator $A_0$, for example, outputting a voltage of 24 volts, this alternator AO being connected to a rectifier forming a main direct voltage source $S_0$, for example, outputting a direct voltage $V_0$ equal to 42 volts.

A first auxiliary source $S_y$ outputting a direct voltage $V_y$ equal to 42 volts, is directly formed by the main source S0 buffered by a battery $BAT_y$, for example, a 36 volt battery, this first auxiliary source supplying a first distribution network $RD_y$.

A second auxiliary source $S_z$ outputting a direct voltage $V_z$ equal to 14 volts includes a direct/direct converter powered by the main source $S_0$, the output of which is buffered by a battery $BAT_z$, for example, a 12 volt battery, this second auxiliary source powering a second distribution network $RD_z$.

Conventional solutions may be sufficient to satisfy some needs, and although these solutions use a single voltage as is the case for the classical solution, or at least two voltages as is the case of the architecture illustrated in FIG. 1, but a number of problems can arise with these solutions.

Firstly, the distribution of electrical energy using a voltage regulated circuit makes it necessary for each consumer device to includes its own direct-direct converter or be dimensioned to accept the available power supply voltage.

For example, since computers use electronic components that only accept low power supply voltages, usually 3 volts or 5 volts, all computers must be provided with direct-direct converters.

However, on the other hand, filament lamps must be sized to be supplied at 12 volts since they are too numerous and their value is too low to be fitted with such a converter. However, this size imposes the choice of relatively thin filaments, and consequently their life is not optimized.

Moreover, since these conventional solutions are designed such that a strong variation in the consumption of electrical energy will change the available voltage on the distribution network, the devices consuming electricity energy must themselves be designed to be able to resist these variations and therefore satisfy a severe specification that increases their manufacturing cost.

Furthermore, since conventional architectures are designed such that a short circuit in any one of the devices consuming electrical energy could cause an over current in the electrical harness and could destroy it if an appropriate protection is not provided, it is essential that the distribution network should be protected by fuses.

Finally, since they impose the use of capacitive input stages that naturally act as filters for high frequency signals, these architectures cannot be used as physical supports for carrier current information transmission systems.

It is an object of the present invention to provide an electrical energy supply circuit for an automobile vehicle, capable of solving at least one of the problems mentioned above due to its inherent principle.

SUMMARY

Consequently, the circuit according to the present invention includes a primary stage and at least first and second secondary modules forming the first and second auxiliary sources respectively, the primary stage including a primary alternating current generator supplied by the main source, a current loop that carries an alternating current produced by the primary generator, and at least first and second windings installed in series in the current loop and forming primary windings of the corresponding first and second transformers, and each secondary module including a corresponding transformer secondary winding and a current-voltage converter connected to this secondary winding, this current-voltage converter being configured to produce a direct output voltage from the alternating current circulating in the secondary winding.

Each secondary module may thus be sized such that its output voltage is adapted to the type of device powered by this module.

Therefore, devices consuming electrical energy are no longer sized under the constraint of an imposed power supply voltage, but they may be sized simply to satisfy the need to optimize its cost with regard to its function.

Moreover, to the extent that the network is configured for an alternating current, it does not filter high frequency signals, and therefore it may be used as a physical support for a carrier current information transmission system.

In an example embodiment of the present invention, the primary alternating current generator includes a primary alternating current regulator capable of controlling the amplitude of the current circulating in the current loop, and each secondary module includes a voltage regulator.

Due to the independence thus introduced between the global load on the circuit and the individual load of the different secondary modules, variations in the load on one such module do not affect the other modules, for which the output voltage is thus protected from any variation.

Moreover, to the extent that the current in the current loop, in other words in the harness that passes through the vehicle, is regulated in a primary stage, the risk that a short circuit in an electricity energy consumer device may cause a short circuit that would burn the harness is very much reduced.

For example, the primary alternating current generator may include a resonant circuit installed in series in the current loop and in which oscillations are maintained by pumping electrical charges taken at a given frequency on a charge storage circuit connected to the main direct voltage source and itself including one or several capacitors.

Consequently, the primary alternating current generator may include a transistor bridge and a driver circuit, the transistor bridge being connected to the charge storage circuit and to the resonant circuit to transfer electrical charges picked up from the charge storage circuit to the resonant circuit, and each pair of transistors in the transistor bridge adopting a cyclically variable conducting state, controlled by an output signal at the determined frequency of the driver circuit.

The driver circuit itself may include a voltage frequency converter controlled by a control voltage that depends on the direct voltage of the main source, to produce an output signal at the determined frequency, the current regulator including a specific retroaction loop capable of modifying the control voltage of the voltage-frequency converter as a function of the current circulating in the current loop.

Under these conditions, the voltage regulator provided in each secondary module may be configured to regulate the amplitude of the direct output voltage from the current-voltage converter.

For example, this current-voltage converter may include a rectifier bridge connected to the secondary winding of the transformer, and a capacitive circuit connected to the secondary winding through an electrical link through the rectifier bridge, this rectifier bridge charging this capacitive circuit.

In this case, the voltage regulator may include a threshold detector comparing the charging voltage of the capacitive circuit to a predetermined voltage value, and a switching device controlled by the threshold detector to selectively short circuit the secondary winding, and consequently to interrupt the energy transfer between the secondary winding and the capacitive circuit when the charging voltage of this capacitive circuit reaches the predetermined voltage value.

The advantages of the electrical energy supply circuit according to the present invention are particularly significant in the case in which the transformation ratios of the first and second transformers are different from each other, and the different secondary modules may thus be used to different sized groups of devices consuming electrical energy at different voltages.

More generally, the present invention relates to an electrical energy supply circuit for an automobile vehicle wherein this circuit includes a primary stage including a main source that outputs an alternating current to a current loop input into a primary winding of a transformer. The secondary winding of this transformer is associated with an alternating current to direct voltage and/or current converter that then forms an auxiliary direct voltage or current source.

Thus, the electrical energy supply circuit according to the present invention includes a main electricity generator and at least one secondary direct voltage or current power supply.

There are many advantages in using a current loop. For example, all that is necessary to install a current loop is to install electrical cables passing through all or some of the vehicle for connection to the devices to be powered.

There may be several transformers, and therefore several secondary power supply sources may power several devices in parallel. Thus, each device only includes its own power supply adaptor.

According to one example embodiment, the current loop includes a winding forming the secondary of a transformer, the primary of which is powered by a supplementary source of electrical energy, for example, a supplementary independent energy source type.

In this case, the supplementary source of electrical energy and/or the main source may include an energy storage element, the current being such that it enables energy exchanges between the main source and the supplementary source.

In one example embodiment, the automobile vehicle is of the electrical traction type and the main energy source is arranged to draw its energy from the power supply source of the electric traction motor, this motor power supply source directly powering this electric traction motor without passing through the current loop, and the auxiliary direct current or voltage source is designed for the power supply of at least one other device on the vehicle.

According to one example embodiment, the main energy source powers a second primary stage outputting an alternating current to a second current loop that powers the primary of a second transformer, the secondary of which powers a second control device identical to a first control device powered by the secondary of the transformer in the first current loop, this second device being intended to replace the first if there is a failure in the first device.

In this case, the first and the second devices may be used to control a vehicle safety device such as a braking device.

In one example embodiment, the circuit includes at least two current loops configured to supply power to devices with various natures, for example, some in the engine compartment and others in the passenger compartment.

According to another example embodiment, an AC current to direct voltage or current converter includes more than one direct voltage and/or current outputs, for example, with different values.

In one example embodiment, the current loop includes several complementary connectors that make the loop continuous when they are joined together, or a transformer winding may be introduced into the primary circuit when they are separated.

The present invention also relates to a module for a circuit according to the present invention that includes a transformer in which the primary winding may be connected in the current loop.

The present invention also relates to a module for a circuit according to the present invention including a transformer for which the secondary winding may be connected into the current loop.

Regardless of the arrangement, the current loop (or loops) may be used to transmit information signals.

Other characteristics and advantages of the present invention will become clear from the following disclosure that is given for guidance and is in no way restrictive, with reference to the attached drawings.

BRIEF DESCRIPTION OF THE DRAWINGS

FIG. 1 is a schematic diagram illustrating a conventional architecture of the power supply circuit.

FIG. 2 is a schematic view of the structure of a circuit according to the present invention.

FIG. 3 is a schematic view illustrating the primary stage of a circuit according to the present invention.

FIG. 4 is a schematic view illustrating the secondary module of a circuit according to the present invention.

FIG. 5 is a schematic view illustrating one example embodiment of the present invention including a supplementary independent power supply source.

FIG. 6 is a schematic view illustrating another example embodiment of the present invention when used in an electrical vehicle.

FIG. 7 is a schematic view illustrating another example embodiment of the present invention.

FIGS. 8a and 8b illustrate an example embodiment in which the number of secondary modules connected to the main power supply circuit may be modified.

DETAILED DESCRIPTION

As illustrated in FIG. 2, the electrical energy supply circuit of the present invention, which is configured particularly for use in an automobile vehicle, includes a main source $S_0$ of a direct voltage $V_0$ powered by a rotating machine, such as an alternator $A_0$, and several auxiliary voltage sources denoted $S_1$, $S_2$, $S_{n-1}$ and $S_n$ powered from the main power supply source $S_0$ and that output direct voltages denoted $V_1$, $V_2$, $V_{n-1}$ and $V_n$ respectively to power distribution networks $RD_1$, $RD_2$, $RD_{n-1}$ and $RD_n$ respectively.

As in the architecture illustrated in FIG. 1, one of the auxiliary sources denoted $S_y$ and outputting a direct voltage $V_y$ may be formed directly by the main source $S_0$, buffered by a battery $BAT_y$ to power a first distribution network $RD_y$.

The circuit according to the present invention includes a primary stage 1 (FIG. 3) and several secondary modules such as $S_1$ and $S_2$ (FIG. 2), each of which forms one of the auxiliary sources.

More precisely, the primary stage 1 includes a primary current generator 10 (FIGS. 2 and 3) that is powered by the main source $S_0$ and that outputs an alternating current $I_1$, a current loop BC (FIGS. 2 and 3) in which the alternating current $I_1$ produced by the primary generator 10 circulates, and several windings, such as $E_{11}$ and $E_{12}$, installed in series in the current loop BC, each winding forming the primary winding of a corresponding transformer such as $T_1$ and $T_2$.

According to a second aspect of the present invention, each secondary module, such as $S_1$ and $S_2$, includes a winding, such as $E_{21}$ and $E_{22}$, forming the secondary winding of the corresponding transformer $T_1$, $T_2$ and a current-voltage converter CCV connected to this secondary winding $E_{21}$, $E_{22}$.

Finally, according to a third aspect of the present invention, the current-voltage converter CCV is able to produce a direct output voltage, such as $V_1$ and $V_2$, starting from the alternating current such as $I_{21}$ or $I_{22}$ that circulates in the secondary winding, such as $E_{21}$ and $E_{22}$.

As illustrated in FIG. 3, which illustrates an example embodiment of the circuit according to the present invention, the primary alternating current generator 10 includes a current regulator 11 that controls the amplitude of the current $I_1$ circulating in current loop BC, that will be described below.

This primary alternating current generator 10 also includes a resonant circuit 12, a transistor bridge 13 and a driver circuit 14, the resonant circuit 12 including, for example, a capacitor C12 and an inductance L12 mounted in series in the current loop BC.

The transistor bridge 13 includes two pairs of opposite transistors, namely the pair 131, 133 and the pair 132, 134.

The transistor bridge 13 is connected through nodes common firstly to transistors 131, 132 and secondly to transistors 133, 134, to the terminals of a charge storage circuit, for example, composed of one or several capacitors Q.

This capacitor Q is permanently charged at voltage $V_0$ by the main direct voltage source $S_0$ to which it is connected.

The transistor bridge 13 is also connected through nodes common firstly to transistors 131, 134 and secondly transistors 132, 133, to the current loop BC and particularly to the series resonant circuit 12.

The driver circuit 14 produces an output signal S14 with two phases in alternation, $\phi 1$ and $\phi 2$, at a frequency Fc and applied to transistor pairs 131, 133 and 132, 134 respectively to control the conducting state of these pairs of transistors.

Provided that the frequency Fc is not too different from the natural resonant frequency of the resonant circuit 12, this circuit is also kept in oscillation by the electrical charges injected to it by the transistor bridge 13 at frequency Fc and with an alternating polarity, by pumping these charges from the charge storage circuit Q, at constant polarity.

The current $I_1$ set up in the loop BC is a sinusoidal (or almost sinusoidal) alternating current, for which the frequency may, for example, be chosen to be about 70 kHz.

The resonant circuit 12 may be simplified by eliminating the capacitor C12 such that it only includes an inductance, such as L12, and the oscillations of the inductance may be maintained by appropriate control of the transistors in bridge 13.

Although economically more attractive, the technical performances of this variant are not as good as the technical performances in the illustrated solution because it results in significant losses.

As illustrated in FIG. 3, the driver circuit 14 includes a voltage-frequency converter CVF controlled by a control voltage Vc.

The voltage Vc, that depends on the direct voltage $V_0$ of the main source $S_0$, is also controlled by the current regulator 11, the role of which is to adapt the frequency Fc as a function of the current $I_1$ circulating in the current loop BC.

More precisely, the current regulator 11 includes a retroaction loop schematically indicated by an alternating current-direct voltage converter 111 and by an amplifier 112, in which a voltage increasing with the amplitude of the alternating current $I_1$ circulating in the current loop BC is applied to the counterreaction input of the amplifier 112, from the converter 111.

With this arrangement, the electric charge pumping frequency Fc is regulated to bring the amplitude of the alternating current $I_1$ to the required value, that may depend on the electrical energy demand from the entire circuit.

The current-voltage converter CCV in each secondary module, such as $S_1$ and $S_2$ (FIGS. 3 and 4), includes a rectifier bridge PR connected to the secondary winding, such as $E_{21}$ or $E_{22}$ of the corresponding transformer, $T_1$ or $T_2$, and a capacitive circuit K.

The capacitive circuit K is connected to the secondary winding of the corresponding transformer through the rectifier bridge PR that charges this capacitive circuit K at constant polarity.

Each secondary module (FIG. 4) also includes a voltage regulator RGV, the role of which is to regulate the amplitude of the direct output voltage, such as $V_1$ or $V_2$, output by the current-voltage converter CCV.

For example, the voltage regulator RGV includes a switch J controlled by a threshold detector DS.

The function of the threshold detector DS is to compare the charging voltage of the capacitive circuit K with a set voltage value supplied to it, such as $V_{s1}$, and to control the switch J so as to connect the capacitive circuit K to the secondary winding of the corresponding transformer through bridge PR for an energy flow when the charging voltage of this capacitive circuit K is less than the set value $V_{s1}$, and so as to isolate the capacitive circuit K in the secondary winding from the energy flow by short circuiting the secondary winding when the charging voltage of this capacitive circuit K reaches the set value $V_{s1}$, the bridge PR being non-conducting and thus preventing capacitive circuit K from discharging through the closed switch J.

The arrangement of functions described above may be used by circuits with various structures.

In particular, in the case in which the rectifier bridge PR is not formed of diodes, or is not formed solely of diodes, unlike the normal case, but is composed partially of two transistors installed in series between the terminals of the secondary winding of the corresponding transformer on each side of a terminal in the capacitive circuit K and performing a synchronous rectification at the frequency of the primary current, the switch J may include these two transistors, which simultaneously changeover to the conducting state to fulfil the closing function of this switch J.

According to the present invention, the various secondary modules are used to power various families of devices consuming electrical energy, arranged in groups at least as a function of their technology, their energy needs and possibly their layout in the vehicle.

For example, a 100 volt module may be provided at the front of the vehicle to power discharge lamps. Another 7 volt module may be provided near the front of the vehicle to power filament lamps and computers under the bonnet. A third 14 volt module may be provided in the vehicle passenger compartment to power medium power devices, such as the Hi-Fi system, etc.

Considering this diversity, in practice it is useful to make sure that the transformation ratios of the various transformers associated with different secondary modules, in other words the ratios of the number of turns in the primary and secondary windings in these transformers, are different, at least in some cases.

Thus, if the numbers of turns in the primary and secondary windings in the transformer $T_1$ associated with module $S_1$ are $N_{11}$ and $N_{21}$ respectively, and if the numbers of turns in the primary and secondary windings of transformer $T_2$ associated with module $S_2$ are $N_{12}$ and $N_{22}$ respectively, then, for example, values are selected such that the ratios $N_{11}/N_{21}$ and $N_{12}/N_{22}$ are different from each other.

The circuit according to the present invention in which it is possible to use power supply cables as the physical medium for the transmission of information by carrier current, significantly optimizes wiring of the vehicle.

Furthermore, since it is possible to send information about the global electrical energy demand to the primary stage by carrier current, the circuit according to the present invention makes it possible to optimize its instantaneous efficiency, since the primary current may then be adjusted to be the right value to output exactly the required power at the maximum voltage, with no excess and therefore no unnecessary losses.

Several other example embodiments of the present invention are described below with reference to FIGS. 5 to 8.

In the example embodiment illustrated in FIG. 5, a supplementary independent power supply source for direct or alternating current is provided in a current loop 56 according to the present invention.

A supplementary independent power supply source 52 in a vehicle may be used for various operations, such as providing energy necessary to start the vehicle (when the main vehicle power supply source is inactive), or to supply power to several secondary devices, such as air conditioning.

For example, this supplementary power supply source 52 may be a fuel cell, a small thermal combustion engine driving an alternator, a device for recuperation of heat energy lost from the main engine (Peltier cell or turbine driven by exhaust gases), a kinetic energy recuperation device during braking phases, or even another alternator.

In conventional vehicles, the presence of a second energy source requires the presence of supplementary protection by fuses, which increases costs and the complexity of the electrical network.

The incorporation of one (or several) supplementary source(s) in a circuit 50 according to the present invention does not make it necessary to provide supplementary protection by fuse.

In the example embodiment illustrated in FIG. 5, the supplementary source 52 is incorporated in the electrical circuit 50 of the vehicle by connecting this supplementary source to a secondary module $S_N$ located in the current loop 56.

Like the other modules $S_1, S_2, \ldots, S_{N-1}$ inserted in the loop 56, this module $S_N$ includes a transformer with windings 51 and 53. When the source 52 is active, a winding 51 in loop 56 forms a secondary winding that outputs energy to this loop 56.

If the source 52 outputs a direct voltage or current, an inverter is added to it, for example, located in module $S_N$.

The elements of the electrical circuit 50 such as the primary generator 10 and secondary modules $S_1, S_2, \ldots, S_{N-1}$ may be powered either by the main source $S_0$ or the supplementary source 52.

In the example embodiment illustrated, the secondary modules are powered by the source $A_0$ and/or the source 52, but various other power supply combinations are possible, including particularly:

1. The primary generator 10 is powered by the main power supply source $A_0$, such as a rotating machine driven by the thermal combustion engine, whereas several secondary modules form power supplies of the same type as module $S_N$ with an independent source.

2. The primary generator 10 is powered by an independent source that becomes a main source.

In this case, it may be possible for a rotating machine driven by the vehicle engine to be connected to a secondary module of the same type as module $S_N$. One or several supplementary independent sources may also each be connected to a secondary module of the same type as module $S_N$.

3. The primary generator 10 is not powered or does not exist. But the loop 56 is powered using at least one independent source, in other words at least one module of the same type as module $S_N$.

In this context, the primary stage may include the secondary module(s) powered by one (or several) independent source(s).

Different methods may be used to store energy, and particularly:

In a first example embodiment, energy is stored only at the input to the primary circuit, for example using battery $BAT_y$.

In another example embodiment, several storage facilities are provided, one of the input to the primary circuit and others at the outputs from some secondary modules.

Furthermore, it is also possible to eliminate the storage at the input to the primary circuit and to keep the storage at the output from some secondary modules, or possibly even to no longer store any energy.

If energy is no longer stored, the independent source 52 supplies the initial energy to start up a thermal combustion engine. In other words, in this case, there is no need for the battery.

The supplementary source 52 may also be put into service at the same time as the main source $A_0$, $S_0$, if the main source fails or is insufficient, for example, to add to the power supply for use by a device.

This supplementary independent source 52 may also be brought into service when the main source $S_0$ is not in operation, for example, when the engine is not running and the alternator $A_0$ is not supplying any power.

Furthermore, the source 52, like the alternator $A_0$, may be used to charge batteries, for example, the battery $BAT_y$.

In one variant, a supplementary battery is associated with source 52. This supplementary battery is then charged by source 52 and/or the main source.

In this case, energy exchanges may occur between the battery $BAT_y$ and the supplementary battery or the source 52 if it is a battery.

The presence of an independent source simplifies management of energy stored in the battery used to start a thermal combustion engine.

The presence of at least one auxiliary source controls air conditioning using one or more compressors driven by an electric motor instead of using mechanical compressors driven by the vehicle thermal combustion engine, this independent source thus avoiding the need to discharge the vehicle battery. The independent source may also be chosen to be more efficient than a thermal combustion engine driving an alternator. Furthermore, an independent source may be less polluting than the thermal combustion engine.

The network 50 illustrated in FIG. 5 provides the same advantages as the other example embodiments, particularly a galvanic isolation between sub-networks connected to each module $S_1, S_2, \ldots, S_{N-1}$ and circuit 50.

Consequently, a short circuit in one of the subnetworks connected to a module $S_1, S_2, \ldots, S_{N-1}$ has no effect on the other sub-networks or on the main circuit 50.

The use of the present invention in a vehicle with electric traction or hybrid traction is described below with reference to FIG. 6. This use is particularly appropriate since safety standards impose galvanic separation between high voltage network(s) powering the vehicle traction motor and low voltage electrical network(s) powering other devices, such as light bulbs or signal bulbs, windshield wipers, etc.

Thus, the network 60 illustrated in FIG. 6 includes a main source 62 outputting a high voltage (for example, 115 V) to a main generator 10, to a battery $BAT_y$ and an electrical motor 68.

As in other example embodiments, the main generator 10 transforms this high voltage into an alternating current circulating in loop 56.

This current loop 56 powers the primary windings $P_1, P_2, \ldots, P_{N-1}$ of transformers forming part of secondary modules $S_1, S_2, \ldots, S_{N-1}$ arranged in loop 56.

Thus, the galvanic isolation between the primaries $P_1, P_2, \ldots, P_{N-1}$ and the secondaries of the transformers in modules $S_1, S_2, \ldots, S_{N-1}$, provides the galvanic isolation required by standards between the high voltage circuit and the low voltage circuit(s) connected to the output(s) of the secondary module(s) $S_1, S_2, \ldots, S_{N-1}$.

Furthermore, a circuit according to the present invention is capable of transmitting high electrical energy to devices consuming large quantities of energy consumption, such as air conditioning, which is necessarily electric on this type of vehicle. For example, for the same cable cross-section in the loop, it is possible to transfer 115/14 times more power than on a vehicle equipped with a 14 V network (or 115/42 times more power than on a vehicle equipped with a 42 V network).

If this power gain is not necessary, the cost of the electrical installation may be reduced by reducing the cross-section of the cables in the loop.

FIG. 7 illustrates use of the present invention in the case in which the control of some devices in the vehicle is doubled up for safety reasons.

It is conventional that some devices vital to operation of the vehicle or safety of the passengers may be protected against a possible power supply failure or a failure of the control devices. For example, this is applicable for electrically controlled brakes or a steering system with no steering column.

This result is usually achieved by doubling up the power supplies and circuits transmitting control signals. Thus, the vital devices are connected to two actuators to which the same control signals are applied and/or to two identical power supplies.

A single actuator and/or a single power supply is (are) active at the same time, the redundant actuator and/or power supply only being effective if there is a failure in the first actuator and/or the first power supply.

In the example embodiment of the present invention illustrated in FIG. 7, two circuits $70_1$ and $70_2$ are provided and are connected to the same main source $S_0$, to make a redundant power supply for vehicle safety devices, each of these circuits including a primary generator $10_1$ and $10_2$, a current loop $78_1$ and $78_2$ and secondary modules $S_{11}, S_{21}, \ldots, S_{(N-1)1}$ and $S_{12}, S_{22}, \ldots, S_{(N-1)2}$.

The secondary module $S_{11}$ on circuit $70_2$ powers a control device $74_1$ for a vehicle safety device $74_2$ and module $S_{12}$ in circuit $70_2$ powers another control device $74_2$ for device 72.

Device $74_2$ powered by module $S_{12}$ is identical to the control device $74_1$ powered by module $S_{11}$. If the device is a brake, these devices $74_1$, and $74_2$ may, for example, be electric motors to apply the brake, each of these motors $74_1$, $74_2$ acting on the same brake control shaft 76.

Thus, if there is a failure in device $74_1$, the second device $74_2$ changes from the standby state to the active state and takes over from the device that has failed.

Failure of an actuator (or control device) may be caused either by the device $74_1$ itself or by a failure in the generator $10_1$ or an element of module $S_{11}$, or by a failure of the loop $78_1$. A failure may also be due to a loss of control signals from device $74_1$.

In general, the present invention provides security against failures, since failure of the secondary module (apart from a break in the primary winding of a transformer) does not affect the other secondary modules connected on the same loop.

In another example embodiment of the present invention illustrated in FIG. 8, an electrical energy supply circuit includes devices to vary the number of secondary modules laid out in a current loop 80 in an electric circuit according to the present invention.

In this respect, pairs 90 of supplementary male connectors 82 and female connectors 84 are provided. These pairs 90 are provided on the conductor 80 of the current loop.

In order to add a secondary module $S_i$, the male conductor 82 (FIG. 8a) is separated from the female connector 84 and the female connector 84i (FIG. 8b) of module $S_i$ is attached to the male connector 82 of conductor 80. The female connector 84 of conductor 80 is attached to the male connector $82_i$ of module $S_i$.

Current may thus circulate in the current loop 80 and in the winding 88 of the new secondary module $S_i$.

In one example embodiment, the vehicle includes at least two current loops. The number of current loops may depend on the layout of the different devices in the vehicle. For example, one loop powers devices under the vehicle bonnet, in other words in the engine compartment, and another loop powers devices located in the passenger compartment.

The choice of the number of loops may also be made as a function of communication protocols using carrier currents. For example, one loop powers devices dialoguing according to the VAN protocol and another loop is provided to power devices dialoguing according to the CAN protocol.

According to another example embodiment, at least one secondary module is capable of producing several direct voltages, with the corresponding transformer including several secondary windings with different numbers of turns. Under these conditions, the number of secondary modules may be limited since the same module may power different types of devices at different voltages.

Some devices may be powered directly with alternating current, and there may be no need for every secondary module to include a direct voltage or current source. In particular, filament lamps or some resistances, particularly heating resistances, may be powered with alternating current.

In one variant of the circuit described with relation to FIG. 4, the switch J configured to cut off the direct power supply or the direct current load is connected to the terminals of a primary winding $E_{11}$, rather than to the terminals of a secondary winding $E_{21}$ as illustrated in FIG. 4.

What is claimed is:

1. An electrical energy supply circuit for an automobile vehicle, comprising:
   a first primary stage powered by a main energy source and configured to output an alternating current to a first current loop supplying power to at least two primary windings of two different transformers; and
   a converter configured to convert alternating current to one of direct current and voltage associated with a secondary winding of each transformer to provide one of an auxiliary direct current and voltage source;
   wherein the first current loop is configured to supply electrical energy to at least two devices on the vehicle at different locations.

2. The circuit according to claim 1, wherein the main energy source includes a rotating machine.

3. The circuit according to claim 2, wherein the rotating machine includes an alternator.

4. The circuit according to claim 2, wherein the rotating machine is configured to power a direct source on an input side of the circuit.

5. The circuit according to claim 1, wherein the first current loop is configured to transmit information signals.

6. The circuit according to claim 1, wherein the first current loop includes a winding forming a secondary of a transformer, a primary of the transformer powered by a supplementary electrical energy source.

7. The circuit according to claim 6, wherein at least one of the supplementary electrical energy source and the main energy source includes an energy storage element, energy being exchangeable between the main energy source and the supplementary energy source.

8. The circuit according to claim 1, wherein the automobile vehicle includes an electric traction motor, the main energy source configured to draw energy from a power supply source for the electric traction motor, the power supply source configured to supply energy directly to the electric traction motor without passing through the first current loop, the one of an auxiliary direct current and voltage source configured to supply power to at least one other device on the automobile vehicle.

9. The circuit according to claim 1, wherein the main energy source is configured to power a second primary stage, the second primary stage configured to output an alternating current to a second current loop, which is configured to power a primary of a second transformer, a secondary of the second transformer configured to power a second control device identical to a first control device, the first control device powered by a secondary of a first transformer of the first current loop, the second control device configured to replace the first control device if there is a failure in the first control device.

10. The circuit according to claim 9, wherein the first control device and the second control device are configured to control a safety device on the automobile vehicle.

11. The circuit according to claim 10, wherein the safety device includes a braking device.

12. The circuit according to claim 1, further comprising at least one second current loop, the first current loop and the at least one second current loop configured to supply power to different types of devices.

13. The circuit according to claim 2, wherein at least one of the devices is arranged in an engine compartment and at least one of the devices is arranged in a passenger compartment.

14. The circuit according to claim 1, wherein the converter includes at least one of a direct voltage output and a direct current output.

15. The circuit according to claim 14, wherein each of the at least one of a direct voltage output and a direct current output is configured to output a different value.

16. The circuit according to claim 1, wherein the first current loop includes a plurality of complementary connectors configured to maintain continuity of the first current loop and to separate so that a winding of a transformer is insertable into the circuit.

17. The circuit according to claim 1, wherein the secondary winding of a transformer is configured to directly supply alternating current to a device in the automobile vehicle.

18. The circuit according to claim 17, wherein the device includes one of a filament lamp and an electric resistance.

19. The circuit according to claim 1, wherein the first primary stage includes a current regulator configured to control an amplitude of current circulating in the first current loop.

20. The circuit according to claim 1, wherein the first primary stage includes a resonant circuit arranged in series in the first current loop and maintained in oscillation by pumping electric charges taken at a determined frequency from a charge storage circuit connected to a main direct voltage source.

21. The circuit according to claim 20, wherein the first primary stage includes a transistor bridge and a driver circuit, the transistor bridge connected to the charge storage circuit and to the resonant circuit to transfer electric charges taken from the charge storage circuit to the resonant circuit, each pair of transistors in the transistor bridge arranged in a cyclically variable conducting state controlled by an output signal from the driver circuit with the determined frequency.

22. The circuit according to claim 21, wherein the driver circuit includes a voltage-frequency converter controlled by a control voltage that depends on a direct voltage of the main energy source to produce the output signal at the determined frequency, the first primary stage including a current regulator configured to control an amplitude of current circulating in the first current loop, the current regulator including a retroaction loop configured to modify the control voltage of the voltage-frequency converter as a function of the current circulating in the first current loop.

23. The circuit according to claim 1, further comprising at least one secondary module including a voltage regulator configured to regulate an amplitude of direct output voltage from a current-voltage converter.

24. The circuit according to claim 23, wherein the current-voltage converter includes a rectifier bridge connected to the secondary winding of the transformer and a capacitive circuit connected to the secondary winding through an electric link through the rectifier bridge, the rectifier bridge configured to charge the capacitive circuit.

25. The circuit according to claim 24, wherein the voltage regulator includes a threshold detector configured to compare a charging voltage of the capacitive circuit with a predetermined voltage value and a switching device controlled by the threshold detector to selectively short-circuit the secondary winding when the charging voltage of the capacitive circuit reaches the predetermined voltage value.

26. The circuit according to claim 1, wherein further comprising a second current loop including first and second transformers having different transformation ratios.

27. The circuit according to claim 23, wherein the charge storage circuit includes at least one capacitor.

* * * * *